May 15, 1923.
O. BROPHY
FRUIT JUICE EXTRACTOR
Filed Nov. 11, 1922
1,454,918
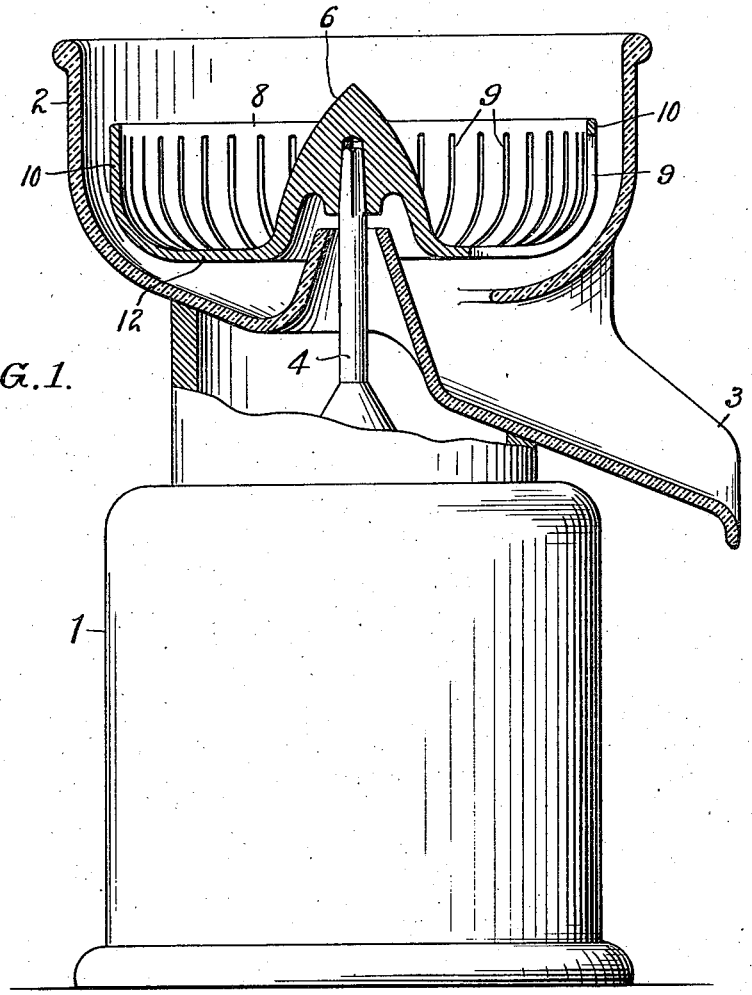
FIG. 1.
FIG. 3.
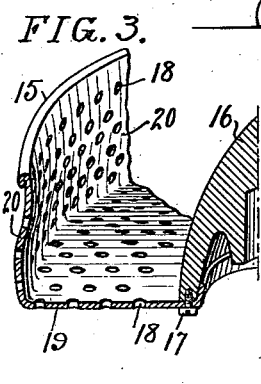
FIG. 2.
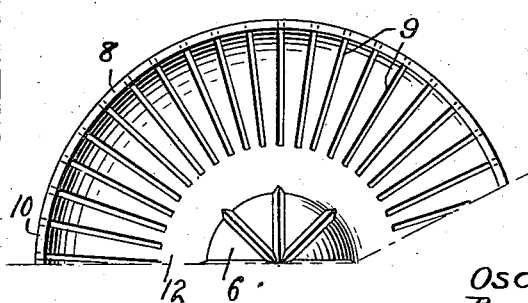
Inventor:
Oscar Brophy
By
F. DeWitt Goodwin
Attorney Patented May 15, 1923.

1,454,918

UNITED STATES PATENT OFFICE.

OSCAR BROPHY, OF PHILADELPHIA, PENNSYLVANIA.

FRUIT-JUICE EXTRACTOR.

Application filed November 11, 1922. Serial No. 600,257.

*To all whom it may concern:*

Be it known that I, OSCAR BROPHY, a citizen of the United States, residing at Philadelphia, in the county of Philadelphia and State of Pennsylvania, have invented certain new and useful Improvements in a Fruit-Juice Extractor, of which the following is a specification.

My invention relates to improvements in a machine known as a fruit juice extractor and particularly relates to a machine having an extractor bulb, or cone, which is rotated at a high speed within a bowl for extracting the juice of oranges and lemons.

The object of my invention is to provide a juice extractor having a strainer, or perforated basket, which is rotatable with the bulb extractor, for the purpose of retaining the pulp and seeds of the fruit and permitting the juice to be driven out of the pulp by the centrifugal action of the rotating strainer or basket; a further object of my invention is to construct the strainer so that the pulp may be readily removed therefrom and to make the strainer removable with the extractor bulb, for cleaning purposes.

By the use of my improved strainer all the juice is quickly discharged from the pulp and the after discharge, or dripping of juice from the pulp is avoided.

Referring to the drawings, Fig. 1, is a central vertical sectional view of a juice extractor showing my improved strainer, the lower portion of the machine being shown in elevation; Fig. 2, is is partial plan view of the strainer, shown in Fig. 1; and Fig. 3, is a partial sectional perspective view of a modified form of strainer.

In the accompanying drawing, in which like reference characters refer to like parts, 1 represents a casing of a machine for extracting the juice of oranges, lemons and the like. Mounted upon the casing 1 is a bowl 2, having a spout 3. A central shaft 4 is rotatably mounted within the casing 1 and is adapted to be operated by an electric motor located within the casing 1, or by mechanical means, both forms being well known and in general use.

The extractor bulb, or cone 6, is detachably mounted upon the end of the shaft 4 and is located within the bowl 2. A one-half portion of an orange or lemon may be held in the hand and forced over the extractor bulb 6 and the rotation of the latter will force the juice out of the fruit.

My invention consists of a strainer, or perforated basket 8, having slots 9 formed therein through which the juice may pass, and the strainer retaining the pulp and seeds of the fruit.

The strainer 8 may be made of metal and formed in one piece with the bulb 6. The strainer 8, as shown in Figs. 1 and 2, is provided with an annular wall 10 for retaining the pulp and seeds when the strainer is rotated. The slots 9 formed in the strainer 8 extend throughout the bottom 12 and also the upstanding wall 10, thus forming free passage-ways for the juice to pass from the strainer into the bowl 2, from which it flows out through the spout 3.

The rapidly revolving strainer will catch the pulp and seeds of the fruit which will be thrown against the annular wall of the strainer and the juice will be forced out of the strainer by the centrifugal action of the revolving strainer, which action will quickly remove all the juice from the pulp.

The strainer is slightly rounded at the angle formed between the annular wall 10 and the bottom wall 12, so that the accumulation of pulp and seeds may be readily removed from the strainer by the aid of a spoon. The strainer 8, being attached to the bulb 6, may be readily removed from the machine, along with the bulb for cleaning purposes.

The form of strainer 15, shown in Fig. 3, is constructed of perforated sheet metal. The bottom portion is attached to the extractor cone or bulb 16 by screws 17 or other suitable fastening devices. The perforations 18 formed in the sheet metal extend throughout the bottom portion 19 and also the vertical or annular wall 20.

Heretofore, in machines of this type some were provided with stationary strainers located within the bowl of the machine for retaining the pulp and seeds. The pulp would collect upon the stationary strainer, or upon the sides and upon the spout of the bowl, if no strainer were used, and the accumulation of pulp would retard the flowing of the juice from the bowl and it would also cause some of the juice to slowly drip from the spout, thus requiring a separate receptacle to be placed under the spout for catching the drip, after the main portion of the juice had run from the spout.

By providing a revolving strainer within the bowl, all the juice is quickly forced out of the accumulation of pulp in the strainer by centrifugal force, therefore the constant dripping of juice from the machine is avoided; and the removable feature of my improved strainer permits the machine to be readily cleaned.

Having thus described my invention I claim and desire to secure by Letters Patent:—

1. A machine for extracting the juice of fruit, comprising, a stationary casing, an extractor bulb rotatably mounted within the casing, a strainer associated with the extractor bulb, and mechanism for rotating the strainer for discharging the juice from the contents of the strainer into the stationary casing by the action of centrifugal force.

2. A machine for extracting the juice of fruit comprising, a stationary casing, a shaft rotatably mounted within the casing, an extractor bulb mounted upon the shaft and positioned within the casing, a strainer rotatable with the said shaft, a retaining wall upon the strainer surrounding said bulb adapted to retain the pulp of the fruit against the action of centrifugal force, and said strainer having perforations formed therein through which the juice may be forced from the strainer into the casing when the strainer is rapidly rotated.

3. A machine for extracting the juice of fruit comprising, a stationary casing, a shaft rotatably mounted within said casing, an extractor bulb mounted upon the shaft and positioned within the casing, a strainer having perforations formed therein, said strainer associated with said extractor bulb and rotatable therewith, said bulb and said strainer being readily detachable from said shaft and removable from the casing, said strainer having an annular upstanding wall adapted to retain the pulp of the fruit against the action of centrifugal force, and means for rapidly rotating the strainer for extracting the juice from the pulp in the strainer and discharging it into the casing.

4. A machine for extracting the juice of fruit comprising, a stationary casing, an extractor bulb rotatably mounted within the casing, a bowl shaped receptacle associated with said bulb, said receptacle having an upstanding annular wall adapted to retain the pulp of the fruit when rapidly rotated, said receptacle having radial slots formed through said wall through which the juice is adapted to be discharged into the casing, and mechanism for rotating said receptacle.

In testimony whereof I affix my signature.

OSCAR BROPHY.